United States Patent Office 2,862,949
Patented Dec. 2, 1958

2,862,949

ORGANIC PHOSPHORUS COMPOUNDS

Earl G. De Witt, Royal Oak, Mich., assignor to Ethyl Corporation, New York, N. Y., a corporation of Delaware No Drawing. Application November 16, 1953
Serial No. 392,453

2 Claims. (Cl. 260—461)

The present invention relates to a class of organic compounds containing phosphorus, sulfur and bromine. In particular, the present invention relates to organic esters of phosphorus having particular utility in the chemical arts.

It is known that phosphorus forms compounds with organic radicals which can be considered as derived from phosphorus acids. In particular, the monomeric phosphorus acids form organic esters generally classifiable as phosphites and phosphates. It is further known that in such phosphite or phosphate esters of monomeric phosphorus acids one or more of the oxygen atoms directly bonded to the phosphorus can be replaced by sulfur. Such esters can be described by the terms thiolophosphite and thiolophosphate when oxygen is replaced by divalent sulfur, and as thionophosphate when oxygen is replaced by semi-polar sulfur. Likewise, the corresponding thiolothionophosphates are known. In such terminology the expression "thiono" refers to semipolar sulfur to distinguish from divalent sulfur. Certain derivatives of the above-mentioned esters of phosphorus have been proposed wherein the organic radical is substituted with chlorine. In particular it is known that chloroalkylphosphates, chloroalkylphosphites and sulfur-containing derivatives thereof can be prepared and have found certain utility in the art.

It is an object of the present invention to provide organic compounds of phosphorus containing sulfur directly bonded to phosphorus and bromine directly bonded to the organic portion of the molecule. It is a further object of this invention to provide a class of organic chemical compounds having wide utility and advantages over organic phosphorus compounds previously known and described. A further object is to provide aliphatic esters of phosphorus-containing sulfur directly bonded to phosphorus and bromine directly bonded to the aliphatic portion of the molecule. Still a further object is to provide β-bromoaliphatic esters of phosphorus acids in which sulfur is directly bonded to phosphorus. These and other objects will become apparent from the further description hereinafter.

The above and other objects of this invention are accomplished by providing bromoaliphatic esters of sulfur-containing monomeric acids of phosphorus wherein said sulfur is directly bonded to phosphorus. A preferred embodiment of my invention comprises those compounds in which the aliphatic group is alkyl.

The bromoaliphatic esters of sulfur-containing monomeric acids of phosphorus of this invention are derived from the monomeric trivalent and pentavalent acids of phosphorus. Thus, I have provided bromoaliphatic sulfur-containing phosphites and bromoaliphatic sulfur-containing phosphates. Both examples of the compounds of this invention can be prepared by reacting cyclic derivatives of olefins with phosphorus bromides.

The compounds of my invention find utility as chemical intermediates, plasticizers, flameproofing agents, fuel and oil additives, and the like.

One example of the phosphites of this invention comprise the β-bromoaliphatic thiolophosphites wherein at least one aliphatic radical is directly bonded to phosphorus through sulfur. It is further understood that this embodiment of the compounds of this invention comprises the mono-, di- and tri-thiolophosphites. The aliphatic groups of such thiolophosphites can be the same or different and can be normal or iso with respect to the linkage of the alkyl radical to phosphorus through sulfur or oxygen.

In general, the above tri-thiolophosphites are prepared by reacting a cyclic sulfide of an olefin with a phosphorus bromide. In one embodiment of this invention β-bromoaliphatic thiolophosphites are prepared by reacting a cyclic aliphatic sulfide (which, however, can be substituted with aryl or other groups) with phosphorus tribromide, as shown by the following equations:

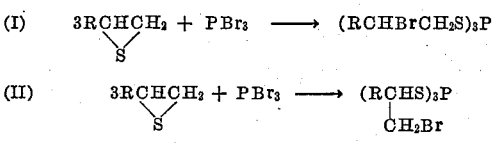

wherein R is an organic radical.

As noted above, the cyclic sulfide linkage can be severed in either of two positions. Depending upon the method of cleavage, the aliphatic groups can be considered as normal or iso. Thus, in equation I the invention is represented as providing tri-(β-bromo-n-aliphatic) trithiolophosphite and in accordance with Equation II there is formed the tri-(β-bromoisoaliphatic) trithiolophosphite. In general the iso compound will predominate but the relative proportion of the two isomers will depend upon the severity of the reaction conditions. Thus, it is also possible to provide a mixture of normal and iso products attached to phosphorus through sulfur. Typical examples of materials of this invention formed in accordance with the above equation include tri-(β-bromoethyl)trithiolophosphite; tri-(β-bromo-n-propyl)trithiolophosphite; tri-(β-bromo-n-butyl)trithiolophosphite; tri-(β-bromo-n-amyl)trithiolophosphite; tri-(β-bromo-n-hexyl)trithiolophosphite; tri-(β-bromo-n-heptyl)trithiolophosphite; tri-(β-bromo-n-octyl)trithiolophosphite; tri-(β-bromo-n-nonyl)trithiolophosphite; tri-(β-bromo-n-decyl)trithiolophosphite; tri-(β-bromo-n-dodecyl)trithiolophosphite; tri-(β-bromo-n-tridecyl)trithiolophosphite; tri-(β-bromo-n-octadecyl)-trithiolophosphite; tri-(2-bromo-3-methylbutyl)-trithiolophosphite; tri-(2-bromo-3-ethylbutyl)trithiolophosphite; tri-(2-bromo-3-ethylpentyl)trithiolophosphite; tri-(α-methyl-β-bromoethyl)trithiolophosphite; tri-(α-ethyl-β-bromoethyl)trithiolophosphite; tri-(α-ethyl-β-bromoethyl)trithiolophosphite; tri-(α-propyl-β-bromoethyl)-trithiolophosphite; tri-(α-butyl-β-bromoethyl)-trithiolophosphite; tri-(α-isobutyl-β-bromoethyl)trithiolophosphite; tri-(α-sec-butyl-β-bromoethyl)trithiolophosphite; tri-(α-amyl-β-bromoethyl)trithiolophosphite; tri-(α-isoamyl-β-bromoethyl) - trithiolophosphite; tri - (α - sec - amyl - β - bromoethyl)trithiolophosphite; tri - (α - tert - amyl - β - bromoethyl)trithiolophosphite; tri-(α-hexyl-β-bromoethyl)trithiolophosphite; tri-(α-heptyl-β-bromoethyl)trithiolophosphite; tri-(α-octyl-β-bromoethyl)trithiolophosphite; tri-(α-nonyl - β - bromoethyl)trithiolophosphite; tri - (α - decyl-β - bromoethyl)trithiolophosphite; tri - (α - dodecyl - β - bromoethyl)trithiolophosphite; tri-(α-tridecyl-β-bromoethyl)trithiolophosphite; and the like.

By proper choice of reactants there also are prepared thiolophosphites of the present invention wherein only one or two of the alkyl radicals contain bromine in the beta position while the other radicals contain chlorine in the beta position. To provide such compounds a cyclic sulfide of an olefin is reacted with PCl$_2$Br or PClBr$_2$. In the former instance the product is predominantly monobromodichloroaliphatic trithiolophosphite. In the latter instance the product will predominate in the monochlorodibromoaliphatic trithiolophosphite. Typical examples of such embodiments of the compounds of this invention include di(β-bromoethyl)-(β-chloroethyl)-trithiolophosphite; di(β-bromo-n-propyl)-(β-chloro-n-propyl)trithiolophosphite; di(β-bromoisopropyl)-(β-chloro-n-propyl)trithiolophosphite; di(β-bromoisopropyl)-(β-chloroisopropyl)trithiolophosphite; β-(bromo-n-hexyl)-di-(β-chloro-n-hexyl)trithiolophosphite; β-(bromo-n-decyl)-di-(β-chloro-n-decyl)trithiolophosphite; di - (α-octyldecyl)-(β-chloroethyl)trithiolophosphite and the like.

Further examples include di(β-bromoethyl)(β-chlorohexyl)trithiolophosphite; (β - bromoethyl)-di-(β-chloroethyl)trithiolophosphite; (β-bromoethyl)-di-(β-chloro-n-propyl)trithiolophosphite; (β-bromoethyl)-di-(β-chloroisopropyl)trithiolophosphite; (β-bromoethyl)-(β-chloro-n-propyl)-(β-chloroisopropyl)trithiolophosphite; (β-bromo-n-propyl)-di-(β-chloro-n-amyl)trithiolophosphite; di-(β-bromo-n-amyl)-(β - chloro-n-amyl)trithiolophosphite; (β-bromo-n-butyl)-di-(β - chloro - n - butyl)trithiolophosphite; di(2-bromo-3-cyclohexyl-n-propyl) - (β - chloro-n-propyl)trithiolophosphite; (2-bromo-2-phenylethyl) - di-(2-chloro-2-phenylethyl)trithiolophosphite and others.

In like manner the bromoaliphatic esters of sulfur-containing monomeric acids of phosphorus comprise the mono- and dithiolophosphites. In providing these examples of compounds of this invention a mixture of olefin oxide and olefin sulfide is reacted with the phosphorus bromide. Thus, by reacting a mixture of olefin oxides and olefin sulfides with phosphorus tribromide, the products include tri-(β-bromoaliphatic)monothiolophosphate and tri-(β-bromoaliphatic)dithiolophosphite. Reaction of a mixture of oxides and sulfides with mixed phosphorus trihalide, such as $PCl_2Br$ and $PClBr_2$, yields the product with mixed halogens. Examples of this type of compound include tri-(β-bromoethyl)dithiolophosphite; tri-(β-bromoethyl)monothiolophosphite; tri-(β-bromoisopropyl)dithiolophosphite; di-(β-chloro-n-propyl)-(β-bromo-n-propyl)dithiolophosphite; di-(β-chloro-n-propyl) - (β-bromo-n-propyl)monothiolophosphite; di-(β-bromo-n-propyl)-(β-chloro-n-propyl)dithiolophosphite; di-(β-bromo-n-propyl)-(β-chloro-n-propyl)monothiolophosphite; di-(β - bromoisopropyl) - (β - chloroisopropyl)dithiolophosphite; di-(β-bromoisopropyl)-(β-chloroisopropyl)monothiolophosphite; di-(β-bromo-n-octyldecyl)-(β-chlorooctyldecyl)dithiolophosphite; di-(β-bromo-n-octyldecyl)-(β-chlorooctyldecyl)monothiolophosphite; di-(β-bromoethyl)-(β-chloro-n-propyl)dithiolophosphite; and di-(β-bromoethyl)-(β-chloro-n-propyl)monothiolophosphite.

In addition to the β-bromophosphites as described above, the corresponding compounds, in which the bromine atom is on another carbon atom of the aliphatic group, are also contemplated by my invention. These compounds can be made, for example, by reaction of the appropriate halohydrin with phosphorus trihalide. Compounds of this type include di-(γ-chloro-n-propyl)-(γ-bromo-n-propyl)trithiolophosphite; (γ-chloro-n-propyl)-di-(γ-bromo-n-propyl)dithiolophosphite; tri-(γ-chloro-n-propyl)-(γ-bromoisopropyl)monothiolophosphite; di-(γ-chloro-n-butyl)-(γ-bromo-n-butyl)trithiolophosphite; di-(γ-chloro-n-butyl) - (γ-bromo-n-butyl)dithiolophosphite; di-(γ-chloro-n-butyl)-(γ-bromo-n-butyl)monothiolophosphite; tri-(α-bromoethyl)trithiolophosphite; tri-(α-bromoethyl)dithiolophosphite; and tri-(α-bromoethyl)monothiolophosphite; and tri-(γ-bromopropyl)-trithiolophosphite.

In addition to the phosphites as hereinabove defined, the compounds of the present invention contemplate phosphates and thionophosphates. Thus, in considering the tribromoaliphatic embodiment of this invention, by appropriate choice of reactants phosphates as follows can be provided: tribromoaliphatic thionophosphates, tribromoaliphatic trithiolothionophosphates, tribromoaliphatic monothiolophosphates, tribromoaliphatic dithiolophosphates, tribromoaliphatic trithiolophosphates, tribromoaliphatic monothiolothionophosphates, and tribromoaliphatic dithiolothionophosphates. Typical examples of such compounds of the present invention include tri-(β-bromoethyl)thionophosphate; tri - (β - bromoethyl)-monothiolophosphate; tri-(β-bromoethyl)dithiolothionophosphate; tri-(β-bromoethyl)trithiolophosphate; tri-(β-bromoethyl)dithiolophosphate; tri-(β-bromo-n-propyl)-thionophosphate; tri-(β-bromo-n-propyl)monothiolophosphate; tri-(β-bromo-n - propyl)dithiolothionophosphate; tri-(β-bromo-n-propyl)trithiolophosphate; tri-(β-bromo-n-propyl)dithiolophosphate; tri-(β-bromoisopropyl)thionophosphate; tri-(β - bromoisopropyl)monothiolophosphate; tri - (β-bromoisopropyl)dithiolothionophosphate; tri-(β-bromoisopropyl)trithiolophosphate; tri-(β-bromoisopropyl)dithiolophosphate; tri-(β-bromo-n-decyl)thionophosphate; tri-(β-bromo-n-decyl)monothiolophosphate; tri - (β - bromo-n-decyl)dithiolothionophosphate; tri-(β-bromo-n-decyl)trithiolophosphate; and tri-(β-bromo-n-decyl)dithiolophosphate. The corresponding mixed halogen compounds having bromine plus a dissimilar halogen in the molecule are also contemplated in the present invention.

The phosphate embodiment of the bromoaliphatic esters of the sulfur-containing monomeric acids of phosphorus can be prepared by two methods. One method for the preparation of the phosphates of this invention comprises reacting a compound of the formula

wherein X is oxygen or sulfur with a phosphorus halide of the formula

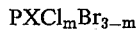

wherein $m$ is an integer from zero to 3 inclusive and $R_1$ and $R_2$ are organic radicals.

A second method of preparing the phosphates of this invention comprises first forming a phosphite as defined hereinabove and including the trioxy bromoaliphatic phosphites and concurrently or subsequently reacting said phosphites or thiolophosphites with an oxidizing agent or sulfur. Among the oxidizing agents which can be employed are the following: oxygen, sulfur trioxide, sulfuric acid, vanadium pentoxide, nitrogen oxide, nitric acid, hydrogen peroxide, sodium peroxide, lead dioxide, persulfuric acid, ammonium persulfate, sodium perborate, potassium permanganate, and others.

To prepare the thionophosphates by this method it is sufficient to include in the reaction mixture or after formation of the phosphite or thiolophosphite elemental sulfur in any one of the various forms in which elemental sulfur occurs. The following examples illustrate means of preparing representative members of the classes of compounds of my invention.

*Example I*

To 271 parts of phosphorus tribromide in a reaction vessel equipped with mechanical agitator and liquid inlet means is added 189 parts of ethylene sulfide over a period of 90 minutes at a temperature of 10° C. After further reaction for 30 minutes the product, tri-(β-bromoethyl) trithiolophosphite, is recovered in high yield.

*Example II*

By the same procedure as Example I except that the reaction temperature is 20° C. propylene sulfide is reacted with phosphorus dichloride bromide. A good yield of β-(bromopropyl)-di-(β-chloropropyl)trithiolophosphite is obtained.

*Example III*

By the procedure of Example I a mixture of 66 parts of ethylene oxide and 90 parts of ethylene sulfide are reacted with 271 parts of phosphorus tribromide. A product comprising tri-(β-bromoethyl) monothiolophosphite and tri-(β-bromopropyl) dithiolophosphite is obtained in good yield.

*Example IV*

Four hundred seventeen parts of 1,3-trimethylene bromohydrin are added over a period of 120 minutes to 271 parts of phosphorus tribromide, with the temperature being gradually raised over this period from 20 to 75° C. A stream of nitrogen is bubbled through the reaction mixture during the entire reaction period to remove hydrogen bromide by entrainment. At the end of the reaction period the mixture is found to comprise tri-(γ-bromopropyl) trithiolophosphite.

*Example V*

A mixture of 451 parts of tri(β-bromoethyl) phosphite and 32 parts of elemental sulfur are heated together for a period of 120 minutes. At the end of this time the reaction mixture is cooled and filtered to remove unreacted sulfur. The filtrate comprises tri-(β-bromoethyl) thionophosphate in good yield.

*Example VI*

Tri-(β-bromoisopropyl) trithiolophosphite is oxidized by bubbling air through it at a temperature of 20° C. for 180 minutes in the presence of sulfur trioxide. At the end of this time the mixture is found to comprise tri-(β-bromoisopropyl) trithiolothionophosphate in good yield.

*Example VII*

To 303 parts of thiophosphoryl bromide in a reaction vessel equipped with mechanical agitator and liquid inlet means is added 174 parts of propylene oxide over a period of 80 minutes, the temperature being gradually raised from 20 to 80° C. Ten parts of phosphorus tribromide are present as a catalyst. At the end of this time the reaction mixture is found to comprise a mixture of tri-(β-bromo-n-propyl) thionophosphate and tri-(β-bromoisopropyl) thionophosphate in good yield.

The compounds of the present invention find special utility in the field of fuel additives, particularly as components of leaded fuels for spark-fired internal combustion engines, especially compositions comprising a petroleum hydrocarbon fuel; an organolead antiknock agent such as tetraethyllead, tetrapropyllead and tetraphenyllead and the like; halogen scavengers such as ethylene dichloride, ethylenedibromide, trichlorobenzenes, tribromobenzenes and the like; and my new compounds bromoalkyl aliphatic esters of sulfur containing monomeric acids of phosphorus wherein said sulfur is directly bonded to phosphorus.

The following example illustrates the effectiveness of my compound in combatting "wild ping" which is deposit-induced autoignition different from ordinary engine knock. It occurs as an erratic uncontrolled ignition occurring at a different period in the combustion cyclic than ordinary combustion induced by the spark.

*Example VIII*

A series of commercial hydrocarbon fuels containing a conventional antiknock mixture comprising tetraethyllead (3 ml. per gallon of fuel), ethylene dichloride and ethylene dibromide are treated as follows: to fuel I is added 0.9 gram per gallon of tri-(β-bromopropyl) trithiolophosphite, to fuel II is added tri-(β-bromoethyl) monothiolophosphate, to fuel III is added 0.9 grams per gallon of di-(β-bromoisopropyl)-(β-chloro-n-propyl) trithiolophosphite, to fuel IV is added 0.9 gram per gallon of tri-(β-bromoethyl) monothiolophosphate, to fuel V is added 0.9 gram per gallon of tri-(β-bromopropyl) thionophosphate. Fuel VI is left untreated to act as a basis of comparison. Each of the above six fuels is then separately subjected to a test procedure involving the use of a single cylinder test engine equipped with an L-head cylinder and an electronic wild ping counter which records the total number of wild pings which occurred during the test period. The electronic counter, which is used in conjunction with an ionization gap, automatically detects and records uncontrolled combustion (wild ping). In this test each of the five fuels containing one of my new compounds reduces wild ping substantially 50 percent as compared with the same fuel (fuel VI) containing antiknock mixture but not my compound.

The bromine-containing phosphorus compounds of my invention find utility as fuel additives both when used alone and when used in admixture with any or all of their isomers as well as when used in admixture with other phosphorus-containing materials. When my compounds are so used, they should be used in amount such that the total amount of phosphorus present in the gasoline is in the range of from about 0.05 to about 0.5 theory of phosphorus. A theory of phosphorus is defined as the amount of phosphorus theoretically required to react with the lead to form lead orthophosphate; namely, two atoms of phosphorus per every three atoms of lead. In addition to the antiknock and fuel compositions disclosed above, my compounds are also useful in connection with other fuels and antiknock mixtures, such as those disclosed in U. S. 1,592,954; 1,668,022; 2,364,921; 2,398,281; 2,479,900; 2,479,901; 2,479,902; 2,479,903; and 2,496,983. When used in connection with organolead antiknock mixtures, quantities of lead up to about 6.3 g. per gallon are preferred.

My bromine-containing esters of phosphorus wherein sulfur is directly attached to a phosphorus atom are especially beneficial as gasoline additives, due to the cooperation of the bromine and phosphorus atoms.

I claim:
1. As a composition of matter, a tri(β-bromo-aliphatic) thionophosphate having the formula

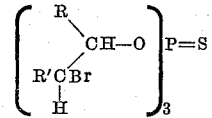

wherein R and R' are selected from the group consisting of hydrogen atoms and lower alkyl radicals.

2. As a composition of matter, tri(β-bromo-isopropyl) thionophosphate having the formula

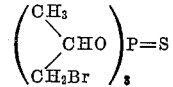

References Cited in the file of this patent
UNITED STATES PATENTS

| | | |
|---|---|---|
| 1,936,985 | Lommel et al. | Nov. 28, 1933 |
| 2,460,043 | Teeters | Jan. 25, 1949 |
| 2,494,126 | Hoegberg | Jan. 10, 1950 |
| 2,494,283 | Cassaday et al. | June 10, 1950 |
| 2,589,326 | Oberright | Mar. 18, 1952 |
| 2,689,258 | McDermott | Sept. 14, 1954 |
| 2,690,451 | Gilbert | Sept. 28, 1954 |

OTHER REFERENCES

Chem. Abst., v. 42, p. 1558 (1948).
Kosolapoff, Organo Phosphorus Compounds, page 185 (1950).